United States Patent [19]
Heckenlaible

[11] 3,910,327
[45] Oct. 7, 1975

[54] WORK-HOLDING ROUTER GUIDE

[76] Inventor: Harry R. Heckenlaible, 2086 Webb St., Stockton, Calif. 95205

[22] Filed: Mar. 10, 1975

[21] Appl. No.: 557,019

[52] U.S. Cl. .......................... 144/136 R; 144/144 R
[51] Int. Cl.² .......................................... B27C 5/04
[58] Field of Search ........ 144/144 R, 136 R, 136 G, 144/142, 137, 253 D

[56] References Cited
UNITED STATES PATENTS

| | | | |
|---|---|---|---|
| 2,717,013 | 9/1955 | Van Zwalenburg............. | 144/144 R |
| 2,838,838 | 6/1958 | Lica ................................ | 144/144 R |
| 3,003,527 | 10/1961 | Fortune........................... | 144/136 R |
| 3,099,299 | 7/1963 | Gilfry.............................. | 144/144 R |
| 3,344,827 | 10/1967 | Kualheim et al................ | 144/144 R |
| 3,770,031 | 11/1973 | Olson.............................. | 144/136 R |
| 3,827,468 | 8/1974 | Markham........................ | 144/136 R |

*Primary Examiner*—Othell M. Simpson
*Attorney, Agent, or Firm*—Roger B. Webster

[57] ABSTRACT

A work-holding router guide comprising an adjustable rectangular frame adapted to surround, in matching peripheral engagement, a rectangular work piece such as a wooden cabinet door, the sides of the frame being flat, straight-edge, border and guide bars adjustably connected together at the corners of the frame by bar-clamping and template units; the inner edges of said bars, together with the templates at the corners of the frame, serving to guide a portable, hand-manipulated, work-piece-supported, electric motor driven router in a path such that the depending router bit cuts a precise ornamental groove, to a controlled depth and of predetermined pattern, in the work piece.

9 Claims, 8 Drawing Figures

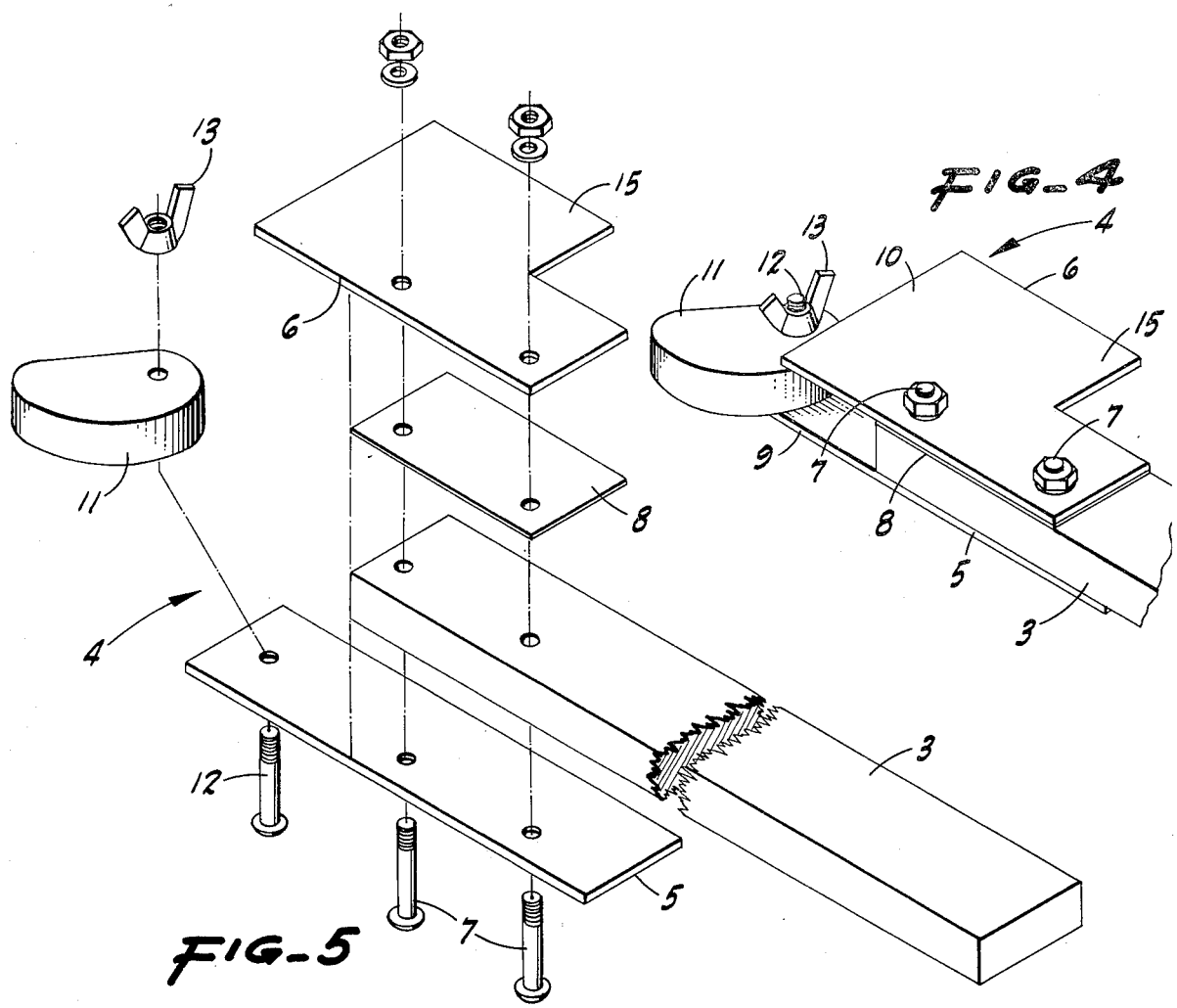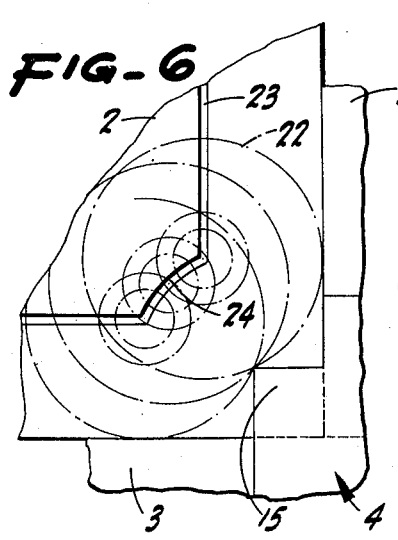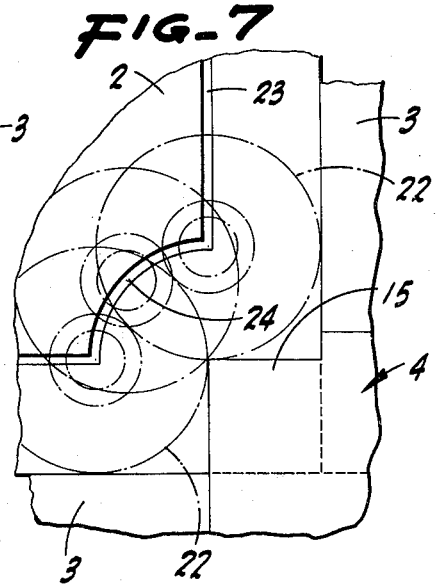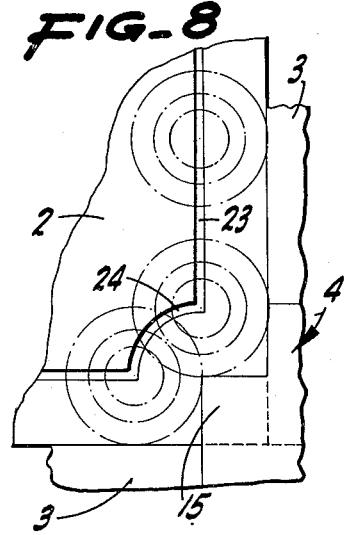

WORK-HOLDING ROUTER GUIDE

BACKGROUND OF THE INVENTION

Heretofore work-holding router guides, as available to the trade, have—in many instances—been of complicated and hence expensive structure, not easy to use nor always accurate in function, not designed for adjustment to accept work pieces of different sizes, and limited with respect to template designs that can be adapted to the guide. The present invention was conceived by me in a successful effort to provide a router guide not characterized by such objections.

SUMMARY OF THE INVENTION

The present invention provides, as an important object, a work-holding router guide which is of simple structure and economical to manufacture; is readily adjustable to accommodate work pieces of variant sizes; includes templates that can be replaced to provide different routing designs; and is accurate and reliable in guiding a router to cut a precise ornamental groove, to a controlled depth and of predetermined pattern, in the work piece.

The present invention provides, as another important object, a router guide, as above, which comprises an adjustable rectangular frame adapted to surround, in matching peripheral engagement, a rectangular work piece such as a wooden cabinet door, the sides of the frame being flat, straight-edge, border and guide bars adjustably connected together at the corners of the frame by bar-clamping and template units; the inner edges of said bars, together with the templates at the corners of the frame, serving to guide a portable, hand-manipulated, work-piece-supported, electric motor driven router in a path such that the depending router bit cuts said ornamental groove in the work piece.

The present invention provides, as another object, a practical, reliable, and durable work-holding router guide, and one which is exceedingly effective for the purpose for which it is designed.

BRIEF DESCRIPTION OF THE DRAWINGS

FIG. 4 is an enlarged fragmentary view of the combination bar-clamping and template unit on one of the border and guide bars; the adjacent bar of the frame, which normally extends through said unit, being omitted.

FIG. 5 is an exploded view of the bar and unit shown in FIG. 4.

FIGS. 6, 7, and 8 are fragmentary diagrammatic plan views showing the manner of obtaining different convex corner sizes in the pattern cut by the router.

DESCRIPTION OF THE PREFERRED EMBODIMENT

Figure 1:
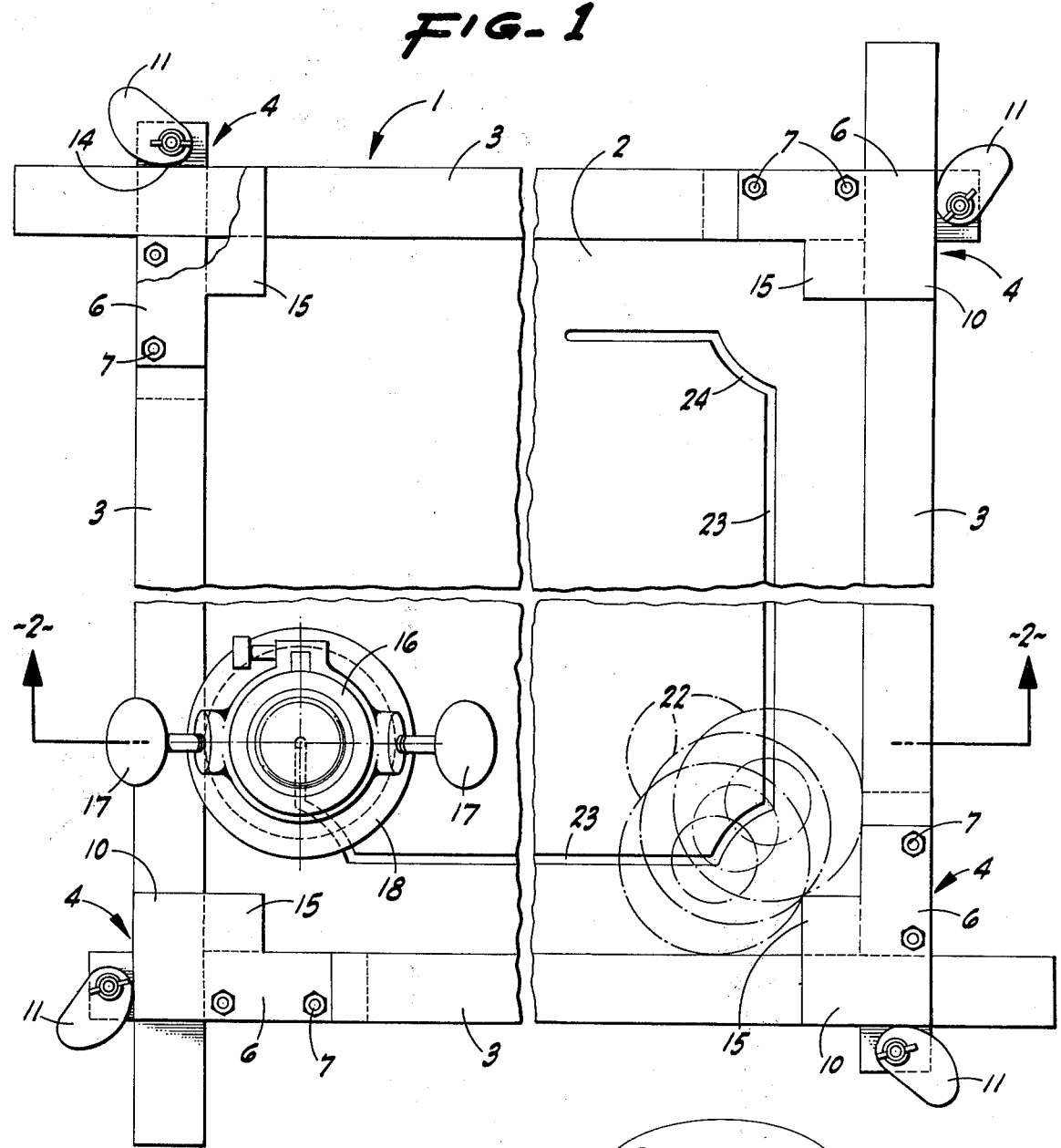
FIG. 1 is a plan view—foreshortened—of the router guide as in use.

Referring now more particularly to the drawings and to the characters of reference marked thereon, the work-holding router guide comprises a rectangular frame, indicated generally at 1, adapted to surround, in matching peripheral engagement, a rectangular work piece 2, such as a wooden cabinet door, into the top surface of which a routed ornamental groove of predetermined pattern is to be cut.

The frame 1 includes four identical, border and guide bars 3 which are elongated, flat, of like thickness, and straight-edged. The bars 3, disposed in rectangular array, are fitted on corresponding ends with a bar-clamping and template unit, indicated generally at 4, through which the end portion of the adjacent right angularly disposed bar 3 extends in initially slidable relation, being inneredge abutted by the end of the bar 3 on which said unit 4 is mounted. It will be recognized that each bar 3—while fitted at one end with a bar-clamping and template unit 4—extends so that the other end portion initially slidably engages through the unit 4 on an adjacent bar 3.

Upon the frame 1 being placed in surrounding relation to a work piece 2, such frame is adjusted—by sliding the bars 3 through units 4—until said bars rest in matching engagement with the corresponding edges of the work piece; the initially slidable portions of the bars 3 then being clamped in the units 4 in the manner as will later appear.

As the bar-clamping and template units 4—which occupy the corners of the frame—are identical, a description of the construction of one will suffice for all.

Each bar-clamping and template unit 4 comprises a longitudinal bottom plate 5 secured against the underside of the related bar 3 in a position with a portion projecting beyond the end of said bar, and a longitudinal top plate 6 secured against the topside of such bar 3 lies in a position with a portion projecting beyond the end thereof; the projection of the bottom plate 5 being substantially greater than the projection of the top plate 6. However, both of such plates project a sufficient distance to completely span transversely across the adjacent right angularly disposed bar 3 which initially slidably engages through the unit 4. The plates 5 and 6 are attached to the bar 3 by nut-secured bolts 7. A thin spacer plate 8 is held between the top plate 6 and bar 3 by said bolts 7; this vertically spacing the projecting portions, indicated at 9 and 10, of plates 5 and 6 a distance slightly greater than the thickness of the initially slidable bar 3 disposed between such projecting portions. This prevents binding of said initially slidable bar 3 in the guideway defined by said projecting portions 9 and 10.

After the frame 1 is disposed about the work pieces 2, the bars 3 are, as previously described, slid through the corresponding bar-clamping and template units 4 until all of said bars lie in relatively tight, parallel engagement with corresponding sides of the work piece; the bars then being clamped in the units 4 by manipulation of eccentric cams 11 mounted and functioning as follows:

An eccentric cam 11 is pivotally mounted on top of the outer extremity of the projecting portion 9 of bottom plate 5 of each unit 4; such cam—which is adapted to be manually positioned—being carried on a pivot bolt 12 which includes a wing nut 13 and the latter—when tightened—locking the cam against rotative motion.

From a released position in non-binding relation to the bar 3 which extends at a right angle and in initially slidable relation through each unit 4, the cam is manually rotated to a working position binding or clamping such bar against the end of the bar 3 on which said unit 4 is mounted; the clamping point of the cam being indicated at 14. After the cam 11 is manually rotated to a clamping position as above, the cam is locked by the wing nut 13.

With cams 11 mounted and functioning as described, the frame 1 can be readily adjusted to and clamped about the work piece 2.

The top plate 6 of each unit 4 includes an integral template 15 which projects inwardly in overhanging relation to the adjacent corner of the work piece 2; each such template having a predetermined pattern—here rectangular.

The portable router, used with the guide, is indicated at 16 and is of a conventional, hand-supported, electric motor driven type; such router 16 including opposed hand grips 17 and a circular base plate 18 below which the driven router bit 19 axially depends a substantial distance. An annular attachment disc 20 is bolted concentrically to the underside of the base plate 18 and includes a relatively short, depending, tubular neck 21; the driven bit 19 extending axially through such neck 21 and terminating a predetermined distance therebelow.

Figures 2, 3:
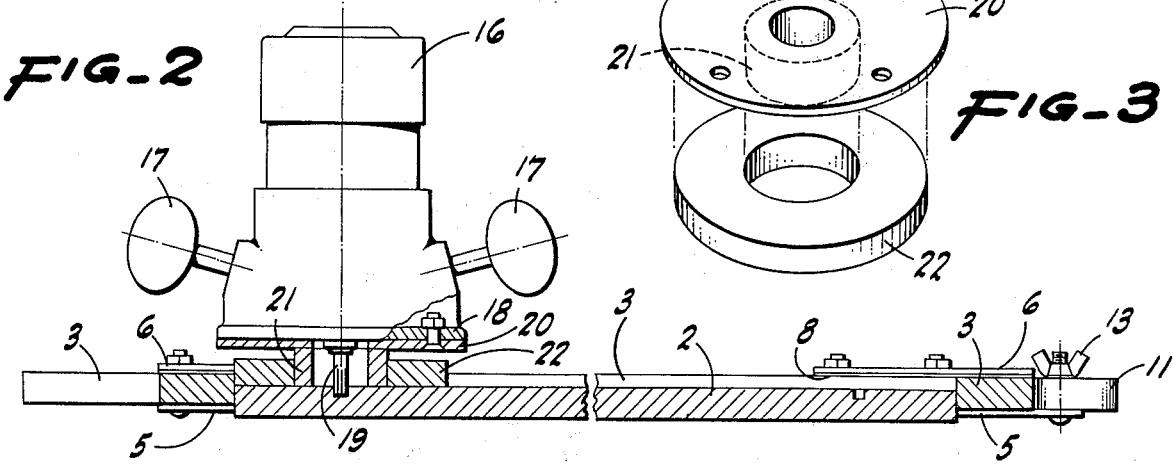
FIG. 2 is a cross section on line 2—2 of FIG. 1
FIG. 3 is an exploded view showing, detached, the attachment disc for the router, and an adapter ring.

An adapter ring 22 (provided, in practice, in different sizes; i.e., outside diameters) is frictionally but removably engaged on the neck 21; the driven bit 19 also extending below such adapter ring. With an adapter ring 22 of selected diameter fitted on neck 21, and the work piece disposed within the confines of frame 1, as hereinbefore described, the groove-cutting operation is undertaken as follows:

By reference particularly to FIGS. 1 and 2, the router 16 is first disposed laterally inwardly from one of the bars 3 at a point intermediate its ends, and with the adapter ring 22 bearing in contact—for guided movement—against the inner edge of such bar, and which edge (as on all bars 3) is exposed in part above the top surface of the work piece 2.

Thereafter, with the router 16 supported by the work piece 2 and in operation, the router is manually progressed, in a clockwise direction, within the confines of the frame 1 with the adapter ring 22 riding—as a follower—in engagement, at all times, with either a bar 3 or a template 15. When such progressive movement is along a bar 3, with the adapter ring engaging said bar intermediate its ends, the router-cut groove is straight as at 23, but when the movement is at a corner of the frame with the adapter ring engaging and traversing a template 15, the router-cut groove is convexly curved as at 24. Thus, after guided movement of the router about the entire frame 1, the ornamental groove, as cut in the work piece, has straight sides 23 and convexly curved corners 24.

The pattern of the corners of the router-cut groove can, of course, be altered by changing the configuration of the templates 15; this, of course, requiring a change of the top plates 6.

Also, by the use of adapter rings of different outside diameters, the size of the convex groove corners 24 can be altered. For example, a convex groove corner 24, as illustrated in FIG. 6, can be reduced in size by employing a smaller adapter ring 22 as illustrated in FIG. 8.

Further, a change in the size of the templates 15 will alter the size of the convex groove corners 24.

If no adapter ring 22 is used, and the neck 21 serves as the follower in contact with the bars 3 and templates 15 as the router is progressed about the frame, convex groove corners much smaller than here illustrated will be formed.

If two or more spaced, parallel grooves are desired in the work piece, this result is simply obtained by cutting the separate grooves with adapter rings of different outside diameters.

After a groove-cutting operation is completed and the router lifted away from the work piece, the cams 11 are manually released by loosening the wing nuts 13, whereupon the frame 1 is expanded and removed from such work piece.

From the foregoing description, it will be readily seen that there has been produced such a work-holding router guide as substantially fulfills the objects of the invention, as set forth herein.

While this specification sets forth in detail the present and preferred construction of the work-holding router guide, still in practice such deviations from such detail may be resorted to as do not form a departure from the spirit of the invention as defined by the appended claims.

I claim:

1. A work-holding router guide comprising a size-adjustable frame adapted to surround a work piece in peripheral engagement, the frame including border and guide bars which are edge-exposed above the top surface of the work piece, and bar-clamping units adjustably connecting the bars at adjacent ends; said units including releasable clamping means to maintain the bars in selected positions of adjustment, and templates associated with the bar-clamping units and overhanging the corners of the work piece; the guide being adapted for use with a portable, hand-manipulated router, the router being supported by the work piece and having a driven groove-cutting bit depending into the said work piece; a guide bar and template follower, and means mounting the follower on the router in position for successive engagement in guided relation with the exposed edges of the guide bars and the templates upon progressive movement of the router on the work piece within the confines of the frame, whereby the router bit cuts a groove of predetermined pattern in such work piece.

2. A router guide, as in claim 1, in which the guide bar and template follower is an annular ring.

3. A router guide, as in claim 2, in which the follower mounting means comprises an attachment disc, the router having a base plate, means attaching the disc to said base plate, and a cylindrical neck depending axially from the disc; the annular ring, which comprises the follower, being engaged on such neck, and the latter surrounding the router bit in concentric relation.

4. A router guide, as in claim 1, in which the bar-clamping units each include, at one end of each guide bar, a bottom plate, a top plate, and means securing the plates to said guide bar with portions of both plates projecting beyond said one end of such bar, another bar of the frame extending in initially slidable relation between such projecting portions of the plates as a guideway; and said releasable clamping means being associated with one of such projecting portions of the plates and adapted to engage and releasably clamp said other bar against said one end of the first-named bar.

5. A router guide, as in claim 4, in which the releasable clamping means includes an eccentric cam journaled, for manual rotation, on said one projecting portion of the plates; said cam being adapted, in a predetermined rotative position thereof, to bear against an outer edge of said other bar so as to clamp the same against said one end of the first-named bar.

6. A router guide, as in claim 5, including a pivot bolt journaling the eccentric cam on such one projecting portion of the plates, and a manually accessible wing nut threaded on the bolt and adapted to tighten against the cam to releasably lock the latter against rotation.

7. A router guide, as in claim 4, in which the top plate of each bar-clamping unit includes, in integral relation, the corresponding template.

8. A router guide, as in claim 7, in which each template is rectangular and overhangs the related corner of the work piece.

9. A router guide, as in claim 4, in which the bars are all of like thickness; there being a thin spacer plate interposed between one of said first-named plates and said first-named bar in order to space said projecting portions a distance slightly greater than the thickness of said other bar.

* * * * *